United States Patent
Iyer et al.

(10) Patent No.: US 10,936,353 B2
(45) Date of Patent: Mar. 2, 2021

(54) SYSTEMS AND METHODS FOR HYPERVISOR-ASSISTED HARDWARE ACCELERATOR OFFLOADS IN A VIRTUALIZED INFORMATION HANDLING SYSTEM ENVIRONMENT

(71) Applicant: Dell Products L.P., Round Rock, TX (US)

(72) Inventors: Shyam T. Iyer, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 366 days.

(21) Appl. No.: 15/596,892

(22) Filed: May 16, 2017

(65) Prior Publication Data
US 2018/0336052 A1    Nov. 22, 2018

(51) Int. Cl.
*G06F 9/455*    (2018.01)
*G06F 9/50*    (2006.01)

(52) U.S. Cl.
CPC ........ *G06F 9/45558* (2013.01); *G06F 9/5005* (2013.01); *G06F 2009/45579* (2013.01)

(58) Field of Classification Search
CPC ............... G06F 9/45558; G06F 9/5005; G06F 12/1036; G06F 12/1063; G06F 2009/45579
See application file for complete search history.

(56) References Cited

U.S. PATENT DOCUMENTS

| | | |
|---|---|---|
| 7,424,710 B1 | 9/2008 | Nelson et al. |
| 7,984,438 B2 | 7/2011 | Leis et al. |
| 8,028,071 B1 | 9/2011 | Mahalingam et al. |
| 8,473,462 B1 | 6/2013 | Banerjee |
| 8,671,414 B1 | 3/2014 | Loafman et al. |
| 8,726,007 B2 | 5/2014 | Chandrika |
| 9,274,823 B1 * | 3/2016 | Koryakin ............ G06F 9/45558 |
| 9,361,145 B1 | 6/2016 | Wilson et al. |

(Continued)

OTHER PUBLICATIONS

9200 NVMe™ SSDs, 2016.

(Continued)

*Primary Examiner* — Lewis A Bullock, Jr.
*Assistant Examiner* — Kevin X Lu
(74) *Attorney, Agent, or Firm* — Jackson Walker L.L.P.

(57) ABSTRACT

In accordance with embodiments of the present disclosure, a method may include responsive to issuance of, by an application executing on a virtual machine of a hypervisor executing on a processor subsystem of an information handling system, an instruction triggering a virtual machine exit of the virtual machine, invoking a virtual machine exit handler of the hypervisor to handle the instruction. The method may also include determining by the virtual machine exit handler whether the instruction has a characteristic indicating that the instruction should be handled by a hardware accelerator device of the information handling system communicatively coupled to the processor subsystem and responsive to determining that the instruction has a characteristic indicating that the instruction should be handled by the hardware accelerator device, offloading by the virtual machine exit handler processing of the instruction to the hardware accelerator device.

12 Claims, 3 Drawing Sheets

(56) References Cited

U.S. PATENT DOCUMENTS

| | | | |
|---|---|---|---|
| 9,767,017 | B2 | 9/2017 | Talagala et al. |
| 9,852,294 | B1 | 12/2017 | Zhu |
| 10,019,282 | B1* | 7/2018 | Naenko ................. G06F 9/4812 |
| 10,109,099 | B2* | 10/2018 | Johnson .................. G06F 9/455 |
| 2011/0050712 | A1* | 3/2011 | Jackson .............. G06F 9/45558 |
| | | | 345/503 |
| 2011/0202701 | A1 | 8/2011 | Maitra |
| 2012/0180047 | A1 | 7/2012 | Cardona et al. |
| 2014/0096132 | A1* | 4/2014 | Wang .................. G06F 9/45533 |
| | | | 718/1 |
| 2014/0201838 | A1 | 7/2014 | Varsanyi et al. |
| 2015/0242227 | A1* | 8/2015 | Nair ....................... G06F 21/60 |
| | | | 718/1 |
| 2015/0249672 | A1 | 9/2015 | Burns et al. |
| 2015/0254330 | A1 | 9/2015 | Chan et al. |
| 2016/0019079 | A1* | 1/2016 | Chawla .............. G06F 12/1081 |
| | | | 710/308 |
| 2016/0048679 | A1* | 2/2016 | Lutas ................. G06F 12/1475 |
| | | | 726/23 |
| 2016/0285871 | A1 | 9/2016 | Chathoth et al. |
| 2016/0378701 | A1 | 12/2016 | Niell et al. |
| 2017/0083354 | A1 | 3/2017 | Thomas et al. |
| 2017/0090963 | A1* | 3/2017 | Nakajima ........... G06F 9/45558 |
| 2017/0185437 | A1 | 6/2017 | Thomas et al. |
| 2018/0004564 | A1* | 1/2018 | Konishi ................ G06F 3/0647 |
| 2018/0004943 | A1* | 1/2018 | Lukacs ................. G06F 21/554 |
| 2018/0107475 | A1* | 4/2018 | Chafer ....................... G06F 8/24 |
| 2018/0150417 | A1 | 5/2018 | Kubala et al. |
| 2018/0173555 | A1* | 6/2018 | Lutas .................. G06F 9/45558 |
| 2018/0293965 | A1* | 10/2018 | Vembu ................. G06F 3/1423 |
| 2018/0314540 | A1* | 11/2018 | Iyer ..................... G06F 9/45558 |
| 2018/0321985 | A1* | 11/2018 | Kakaiya ................ G06F 9/5077 |

OTHER PUBLICATIONS

Suda, et al., Throughput-Optimized OpenCL-based FPGA Accelerator for Large-Scale Convolutional Neural Networks, ACM, 2016.

Tu, Cheng-Chun, Secure I/O Device Sharing Among Virtual Machines on Multiple Hosts, ACM, 2013.

Bo, Chunkun, TCNet: Cross-node Virtual Machine Communication Acceleration, ACM, 2013.

Li, Dingding, Improving disk I/O performance in a virtualized system, Journal of Computer and System Sciences, 2013.

* cited by examiner

SYSTEMS AND METHODS FOR HYPERVISOR-ASSISTED HARDWARE ACCELERATOR OFFLOADS IN A VIRTUALIZED INFORMATION HANDLING SYSTEM ENVIRONMENT

TECHNICAL FIELD

This disclosure relates generally to virtualized information handling systems and more particularly to hypervisor-assisted hardware accelerator offloads in a virtualized information handling system environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCIe") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Conventional virtualized information handling systems may benefit from increased performance of virtual machines. Improved performance may also benefit virtualized systems where multiple virtual machines operate concurrently. Applications executing under a guest OS in a virtual machine may also benefit from higher performance from certain computing resources, such as storage resources.

SUMMARY

In accordance with the teachings of the present disclosure, the disadvantages and problems associated with data processing in a virtualized information handling system environment may be reduced or eliminated.

In accordance with embodiments of the present disclosure, an information handling system may include a hardware accelerator device and a processor subsystem having access to a memory subsystem and having access to the hardware accelerator device, wherein the memory subsystem stores instructions executable by the processor subsystem, The instructions, when executed by the processor subsystem, may cause the processor subsystem to: (i) responsive to issuance of, by an application executing on a virtual machine of a hypervisor executing on the processor subsystem, an instruction triggering a virtual machine exit of the virtual machine, invoke a virtual machine exit handler of the hypervisor to handle the instruction; (ii) determine by the virtual machine exit handler whether the instruction has a characteristic indicating that the instruction should be handled by the hardware accelerator device; and (iii) responsive to determining that the instruction has a characteristic indicating that the instruction should be handled by the hardware accelerator device, offload by the virtual machine exit handler processing of the instruction to the hardware accelerator device.

In accordance with these and other embodiments of the present disclosure, a method may include responsive to issuance of, by an application executing on a virtual machine of a hypervisor executing on a processor subsystem of an information handling system, an instruction triggering a virtual machine exit of the virtual machine, invoking a virtual machine exit handler of the hypervisor to handle the instruction. The method may also include determining by the virtual machine exit handler whether the instruction has a characteristic indicating that the instruction should be handled by a hardware accelerator device of the information handling system communicatively coupled to the processor subsystem and responsive to determining that the instruction has a characteristic indicating that the instruction should be handled by the hardware accelerator device, offloading by the virtual machine exit handler processing of the instruction to the hardware accelerator device.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to: (i) responsive to issuance of, by an application executing on a virtual machine of a hypervisor executing on a processor subsystem of an information handling system, an instruction triggering a virtual machine exit of the virtual machine, invoke a virtual machine exit handler of the hypervisor to handle the instruction; (ii) determine by the virtual machine exit handler whether the instruction has a characteristic indicating that the instruction should be handled by a hardware accelerator device of the information handling system communicatively coupled to the processor subsystem; and (iii) responsive to determining that the instruction has a characteristic indicating that the instruction should be handled by the hardware accelerator device, offload by the virtual machine exit handler processing of the instruction to the hardware accelerator device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
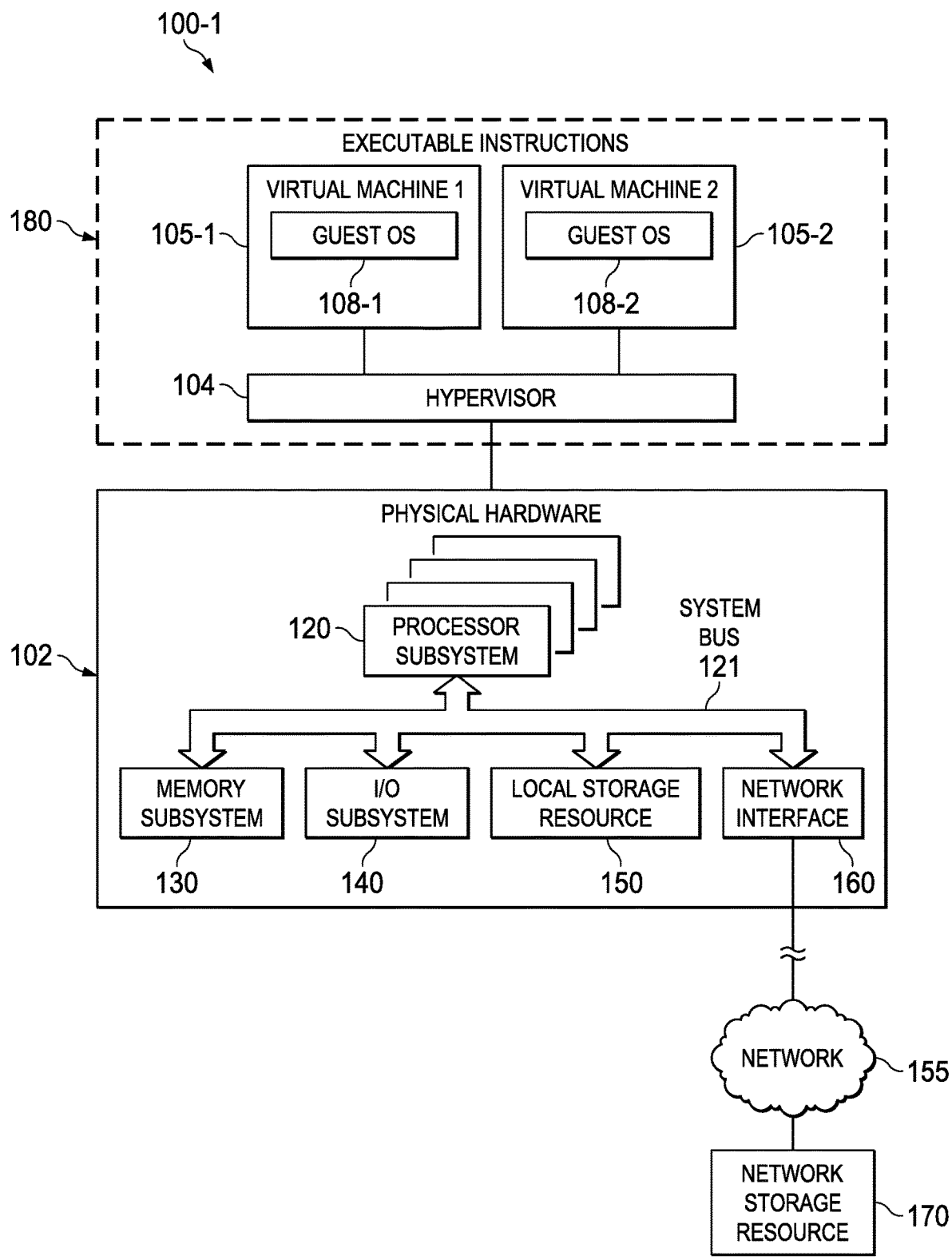
FIG. 1 illustrates a block diagram of selected elements of an example information handling system using an I/O accelerator device, in accordance with embodiments of the present disclosure.
Figure 2:
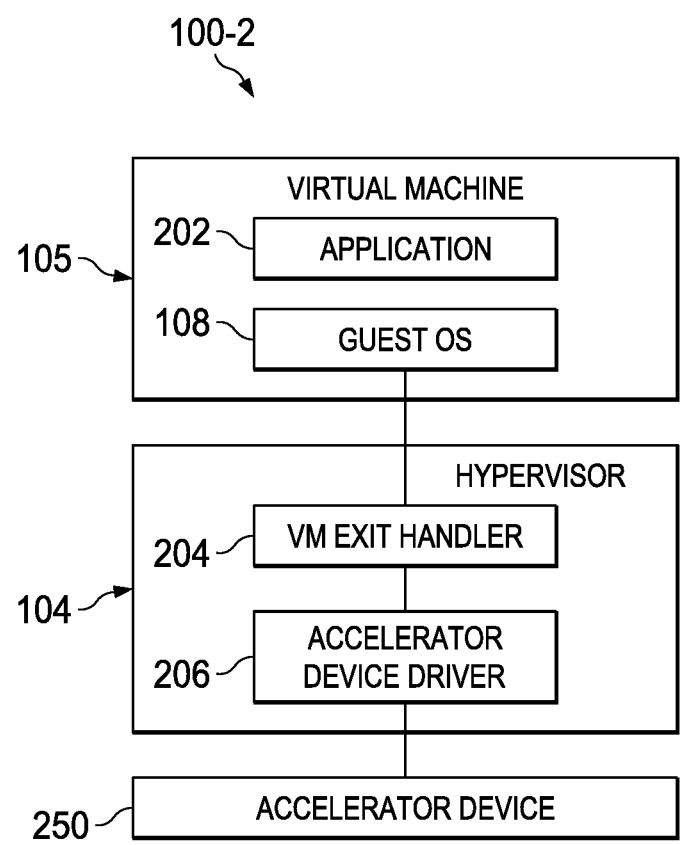
FIG. 2 illustrates a block diagram of selected elements of an example information handling system using an accelerator device, in accordance with embodiments of the present disclosure.
Figure 3:
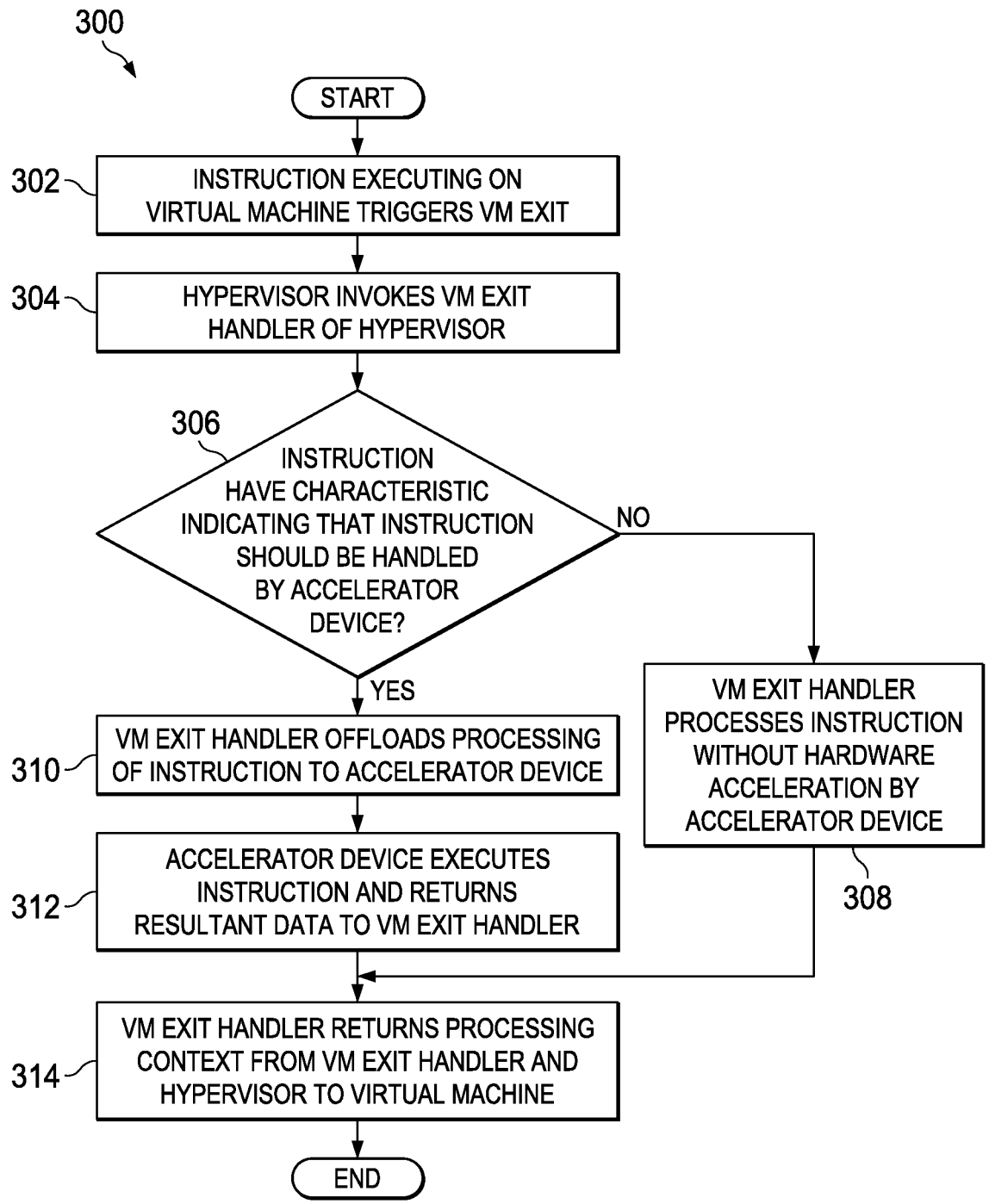
FIG. 3 illustrates a flowchart of an example method for hypervisor-assisted hardware accelerator offloads, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

As noted previously, current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data close to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server-resident hard drives, flash SSD drives, non-volatile memory devices, and/or SAN storage using various types of interconnect fabric (e.g., iSCSI, Fibre Channel, Fibre Channel over Ethernet, etc.). In another example, a layer on top of network drivers may provide access to storage software running on other server instances (e.g., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with pass-through access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, access to storage resources may be improved by using an I/O accelerator device programmed by a storage virtual appliance that provides managed access to local and remote storage resources. The I/O accelerator device may utilize direct memory access (DMA) for storage operations to and from a guest OS in a virtual information handling system. Direct memory access involves the transfer of data to/from system memory without significant involvement by a processor subsystem, thereby improving data throughput and reducing a workload of the processor subsystem. As will be described in further detail, methods and systems described herein may employ an I/O accelerator device for accelerating I/O. In some embodiments, the I/O acceleration disclosed herein is used to access a storage resource by an application executing under a guest OS in a virtual machine. In other embodiments, the I/O acceleration disclosed herein may be applicable for scenarios where two virtual machines, two software modules, or different drivers running in an operating system need to send messages or data to each other, but are restricted by virtualized OS performance limitations.

Referring now to the drawings, FIG. 1 illustrates a block diagram of selected elements of an example information handling system using an I/O accelerator device, in accordance with embodiments of the present disclosure. As depicted in FIG. 1, system 100-1 may represent an information handling system comprising physical hardware 102, and executable instructions 180 (including hypervisor 104 and one or more virtual machines 105). System 100-1 may also include external or remote elements, for example, network 155 and network storage resource 170.

As shown in FIG. 1, components of physical hardware 102 may include, but are not limited to, processor subsystem 120, which may comprise one or more processors, and system bus 121 that may communicatively couple various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCIe bus, HyperTransport (HT) bus, and Video Electronics Standards Association (VESA) local bus.

Network interface 160 may comprise any suitable system, apparatus, or device operable to serve as an interface between information handling system 100-1 and a network 155. Network interface 160 may enable information handling system 100-1 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, firmware, or any combination thereof.

As depicted in FIG. 1, processor subsystem 120 may comprise any suitable system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

Memory subsystem 130 may comprise any suitable system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as system 100-1, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and data. Likewise, network storage resource 170 may comprise computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 may comprise any suitable system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces. In particular, I/O subsystem 140 may include an accelerator device (see also FIG. 2) for accelerating particular processing tasks, as described in greater detail elsewhere herein.

Hypervisor 104 may comprise software (i.e., executable code or instructions) and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In embodiments represented by FIG. 1, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 may represent a host for guest OS 108-1, while virtual machine 2 105-2 may represent a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. In some embodiments, the virtualized hardware representation presented to each of virtual machines 105 may comprise a mutually exclusive (i.e., disjointed or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In some embodiments, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of a guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-2 may comprise a MICROSOFT WINDOWS OS, and another guest OS on another virtual machine (not shown) may comprise a VXWORKS OS. Although system 100-1 is depicted as having two virtual machines 105-1, 105-2, it will be understood that, in particular embodiments, different numbers of virtual machines 105 may be executing on system 100-1 at any given time.

In operation of system 100-1 shown in FIG. 1, hypervisor 104 of information handling system 100-1 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104.

FIG. 2 illustrates a block diagram of selected elements of an example information handling system 100-2 using an accelerator device 250, in accordance with embodiments of the present disclosure. In FIG. 2, system 100-2 may represent an information handling system that is an embodiment of system 100-1 (see FIG. 1). As shown, system 100-2 may include further details regarding the operation and use of accelerator device 250, while other elements shown in system 100-1 have been omitted from FIG. 2 for descriptive clarity. In FIG. 2, for example, virtual machine 105 and guest OS 108 are shown in singular, though they may represent any number of instances of virtual machine 105 and guest OS 108.

As shown in FIG. 2, virtual machine 105 may execute application 202 and guest OS 108. Typically, applications 202 executing on a virtual machine 105 would execute the same instructions as they would if executing on a non-virtualized operating system. The exception to such statement may occur when an application executes an instruction that requires a supervisor access, in which case virtual machine 105 may experience a virtual machine (VM) exit. A VM exit may mark a point in time in which a transition is made between an executing virtual machine (e.g., virtual machine 105) and its virtual machine manager (e.g., hypervisor 104), so that the virtual machine manager may exercise a system management function of the virtual machine to handle the VM exit, after which the virtual machine manager transitions processor control from the virtual machine manager to the virtual machine.

To provide specialized handling of at least certain VM exits, hypervisor 104 may include a VM exit handler 204. In operation, particular instructions executing on virtual machine 105 may trigger a VM exit, thus causing hypervisor 104 to invoke VM exit handler 204. If a particular instruction that triggers a VM exit has a characteristic (e.g., particular opcode, particular payload) indicating that the instruction should be handled by accelerator device 250, then VM exit handler 204 may offload processing of the instruction (e.g., from processor subsystem 120) to accelerator device 250. Hypervisor 104 may have an accelerator device driver 206 that may enable hypervisor 104 to access and communicate with accelerator device 250.

Accelerator device 250 may include any suitable hardware for accelerating processing of data and/or instructions, and may include a graphics processing unit, field programmable gate array, I/O accelerator, or any other suitable accelerator device. In operation, in response to receiving an offloaded instruction from VM exit handler 204 for acceleration, accelerator device 250 may execute the instruction and return any resultant data to VM exit handler 204 via accelerator device driver 206. Responsive to receiving an indication of the completion of the offloaded instruction from accelerator device 250, VM exit handler 204 may return the context of processing subsystem 120 from hypervisor 104 to virtual machine 105, allowing operation of application 202 issuing the hardware-accelerated instruction to continue from the point at which the VM exit occurred.

FIG. 3 illustrates a flowchart of an example method 300 for hypervisor-assisted hardware accelerator offloads, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, an instruction executing on a virtual machine (e.g., virtual machine 105) may trigger a VM exit. At step 304, in response to the VM exit, a hypervisor (e.g., hypervisor 104) may invoke a VM exit handler (e.g., VM exit handler 204) of the hypervisor. At step 306, the VM exit handler may determine if the instruction has a characteristic (e.g., particular opcode, particular payload) indicating that the instruction should be handled by an accelerator device (e.g., accelerator device 250). If the VM exit handler determines that the instruction has a characteristic indicating that the instruction should be handled by the accelerator device, method 300 may proceed to step 310. Otherwise, method 300 may proceed to step 308.

At step 308, responsive to determining that the instruction does not have a characteristic indicating that the instruction should be handled by the accelerator device, the VM exit handler may process the instruction without hardware acceleration by the accelerator device. After completion of step 308, method 300 may proceed to step 314.

At step 310, responsive to determining that the instruction has a characteristic indicating that the instruction should be handled by the accelerator device, the VM exit handler may offload processing of the instruction (e.g., from processor subsystem 120) to the accelerator device. At step 312, in response to receiving the offloaded instruction from the VM exit handler, the accelerator device may execute the instruction and return any resultant data to the VM exit handler (e.g., via accelerator device driver 206).

At step 314, responsive to receiving an indication of the completion of an offloaded instruction from the accelerator device or responsive to completion of a non-accelerated instruction handled by the VM exit handler, the VM exit handler may return a processing context from the VM exit handler and the hypervisor to the virtual machine, allowing operation of an application issuing the instruction to continue from the point at which the VM exit occurred. After completion of step 314, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
a hardware accelerator device; and
a processor subsystem having access to a memory subsystem and having access to the hardware accelerator device, wherein the memory subsystem stores instructions executable by the processor subsystem, the instructions, when executed by the processor subsystem, causing the processor subsystem to:
responsive to issuance, by an application executing on a virtual machine of a hypervisor executing on the processor subsystem, of an instruction triggering a virtual machine exit of the virtual machine, invoke a virtual machine exit handler of the hypervisor to handle the instruction;
determine by the virtual machine exit handler whether the instruction has a characteristic indicating that the instruction should be handled by the hardware accelerator device, wherein the characteristic is based on the instruction comprising a particular opcode;
responsive to determining that the instruction does not have a characteristic indicating that the instruction should be handled by the hardware accelerator device, process the instruction without hardware acceleration;
responsive to determining that the instruction has a characteristic indicating that the instruction should be handled by the hardware accelerator device, offload by the virtual machine exit handler processing of the instruction to the hardware accelerator device, wherein the offloading is carried out by an accelerator device driver executing on the hypervisor, and wherein the hardware accelerator device is configured to execute the instruction and return resultant data to the virtual machine exit handler via the accelerator device driver; and
responsive to completion of the processing of the instruction without hardware acceleration or completion of processing of the offloaded instruction by the hardware accelerator device, return a processing context from the virtual machine exit handler and the hypervisor to the virtual machine.

2. The information handling system of claim 1, wherein the accelerator device comprises a field programmable gate array.

3. The information handling system of claim 1, wherein the accelerator device comprises an input/output accelerator device.

4. The information handling system of claim 1, wherein the accelerator device comprises a graphics processing unit.

5. A method comprising:
responsive to issuance, by an application executing on a virtual machine of a hypervisor executing on a processor subsystem of an information handling system, of an instruction triggering a virtual machine exit of the virtual machine, invoking a virtual machine exit handler of the hypervisor to handle the instruction;
determining by the virtual machine exit handler whether the instruction has a characteristic indicating that the instruction should be handled by a hardware accelerator device of the information handling system communicatively coupled to the processor subsystem, wherein the characteristic is based on the instruction comprising a particular opcode;
responsive to determining that the instruction does not have a characteristic indicating that the instruction should be handled by the hardware accelerator device, processing the instruction without hardware acceleration;

responsive to determining that the instruction has a characteristic indicating that the instruction should be handled by the hardware accelerator device, offloading by the virtual machine exit handler processing of the instruction to the hardware accelerator device, wherein the offloading is carried out by an accelerator device driver executing on the hypervisor, and wherein the hardware accelerator device executes the instruction and returns resultant data to the virtual machine exit handler via the accelerator device driver; and responsive to completion of the processing of the instruction without hardware acceleration or completion of processing of the offloaded instruction by the hardware accelerator device, returning a processing context from the virtual machine exit handler and the hypervisor to the virtual machine.

6. The method of claim 5, wherein the accelerator device comprises a field programmable gate array.

7. The method of claim 5, wherein the accelerator device comprises an input/output accelerator device.

8. The method of claim 5, wherein the accelerator device comprises a graphics processing unit.

9. An article of manufacture comprising:
a non-transitory computer-readable medium; and
computer-executable instructions carried on the computer-readable medium, the instructions readable by a processor, the instructions, when read and executed, for causing the processor to:

responsive to issuance, by an application executing on a virtual machine of a hypervisor executing on a processor subsystem of an information handling system, of an instruction triggering a virtual machine exit of the virtual machine, invoke a virtual machine exit handler of the hypervisor to handle the instruction;

determine by the virtual machine exit handler whether the instruction has a characteristic indicating that the instruction should be handled by a hardware accelerator device of the information handling system communicatively coupled to the processor subsystem, wherein the characteristic is based on the instruction comprising a particular opcode;

responsive to determining that the instruction does not have a characteristic indicating that the instruction should be handled by the hardware accelerator device, process the instruction without hardware acceleration;

responsive to determining that the instruction has a characteristic indicating that the instruction should be handled by the hardware accelerator device, offload by the virtual machine exit handler processing of the instruction to the hardware accelerator device, wherein the offloading is carried out by an accelerator device driver executing on the hypervisor, and wherein the hardware accelerator device is configured to execute the instruction and return resultant data to the virtual machine exit handler via the accelerator device driver; and responsive to completion of the processing of the instruction without hardware acceleration or completion of processing of the offloaded instruction by the hardware accelerator device, return a processing context from the virtual machine exit handler and the hypervisor to the virtual machine.

10. The article of claim 9, wherein the accelerator device comprises a field programmable gate array.

11. The article of claim 9, wherein the accelerator device comprises an input/output accelerator device.

12. The article of claim 9, wherein the accelerator device comprises a graphics processing unit.

* * * * *